United States Patent Office 3,489,833
Patented Jan. 13, 1970

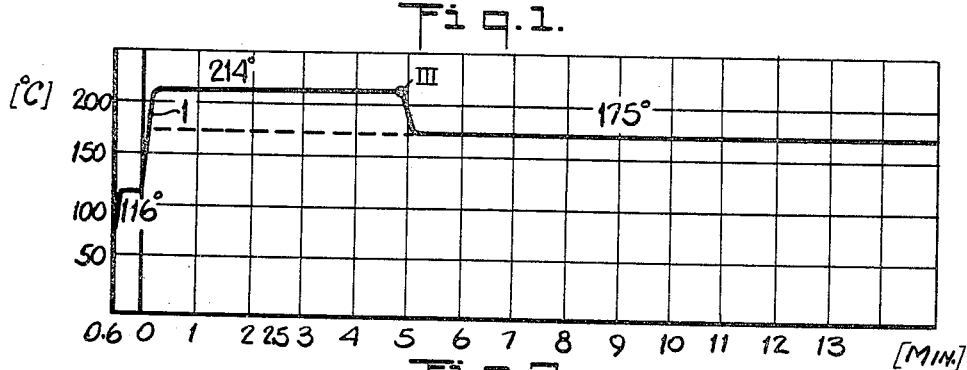
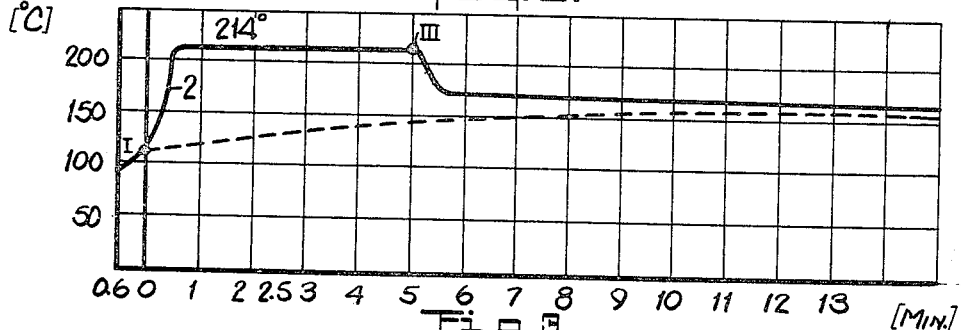
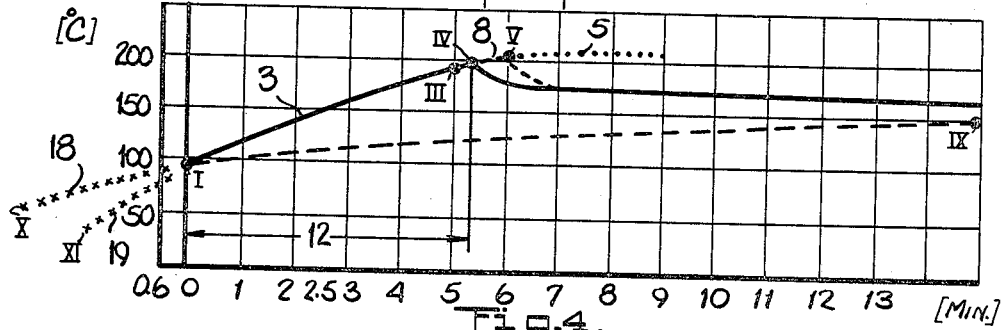
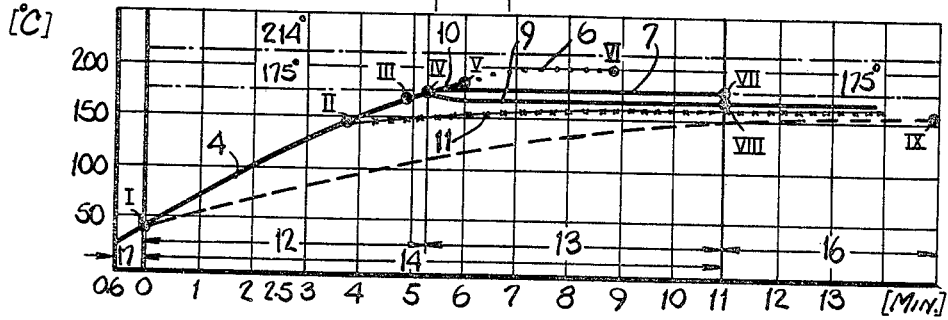
INVENTOR.
JOSEF P. LEHNEN

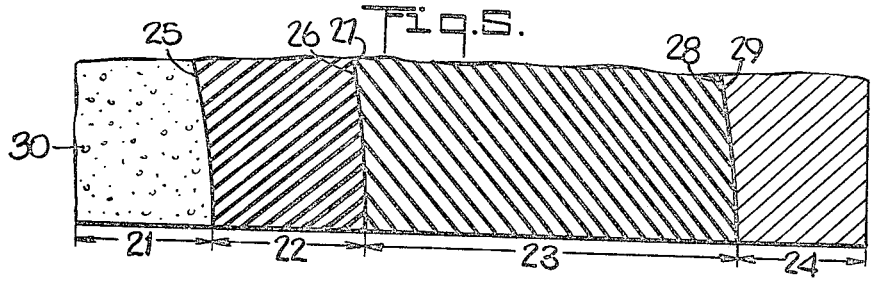
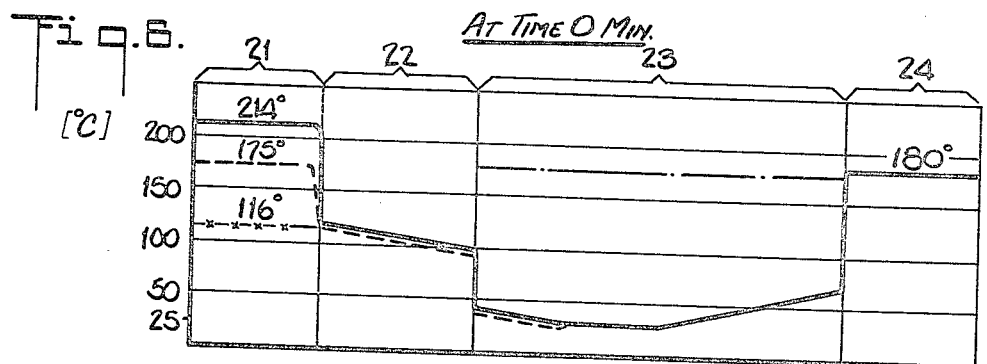
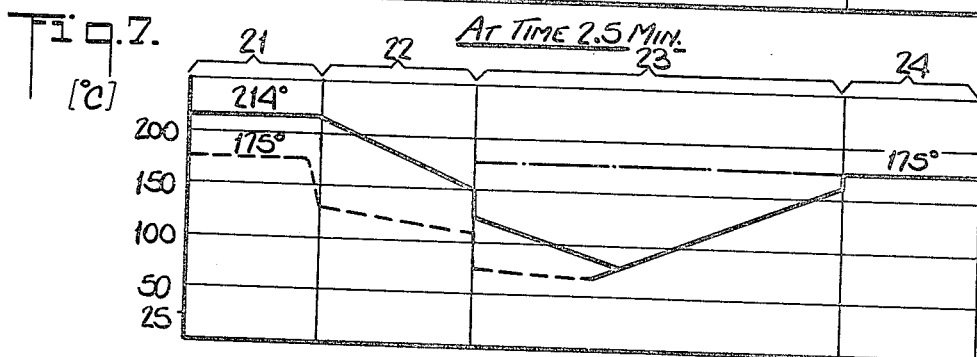
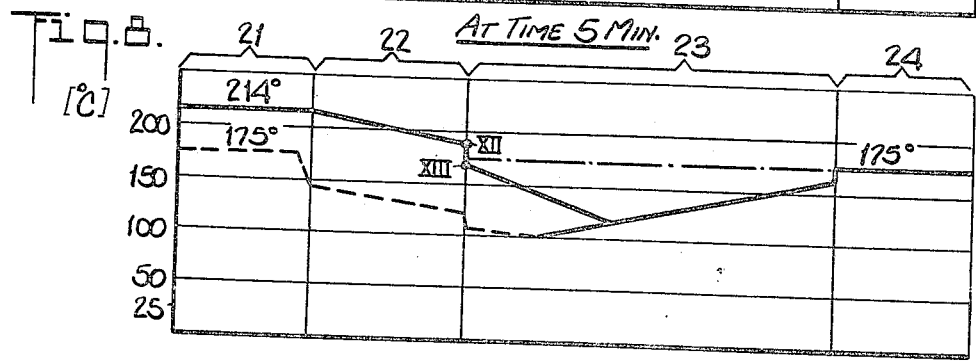

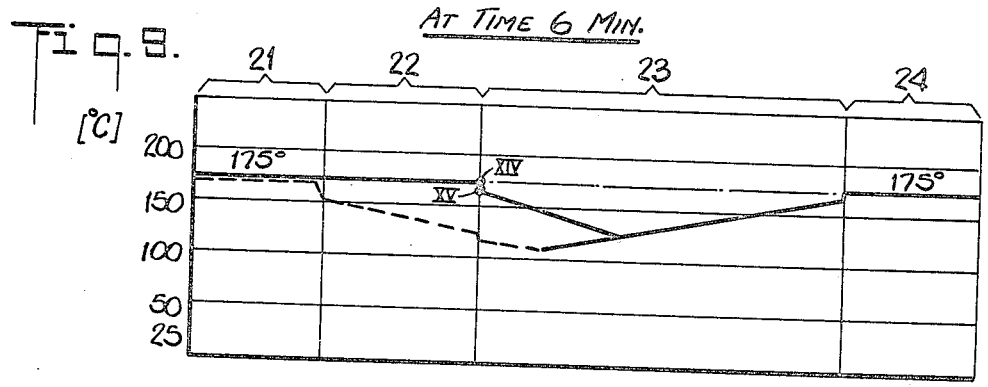
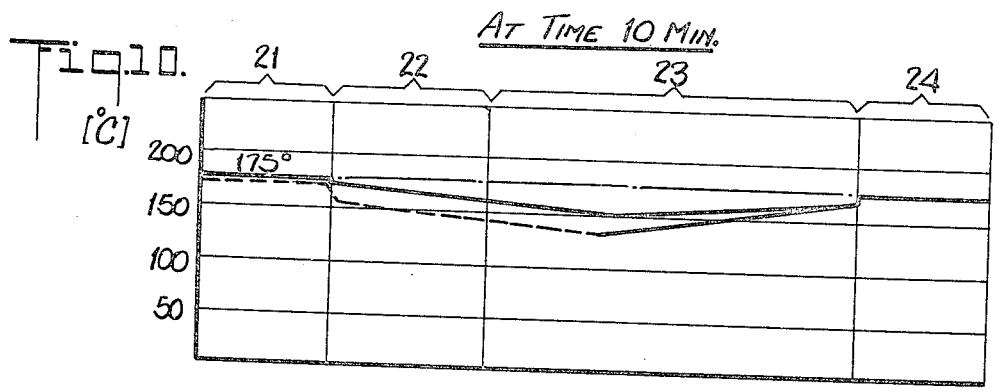
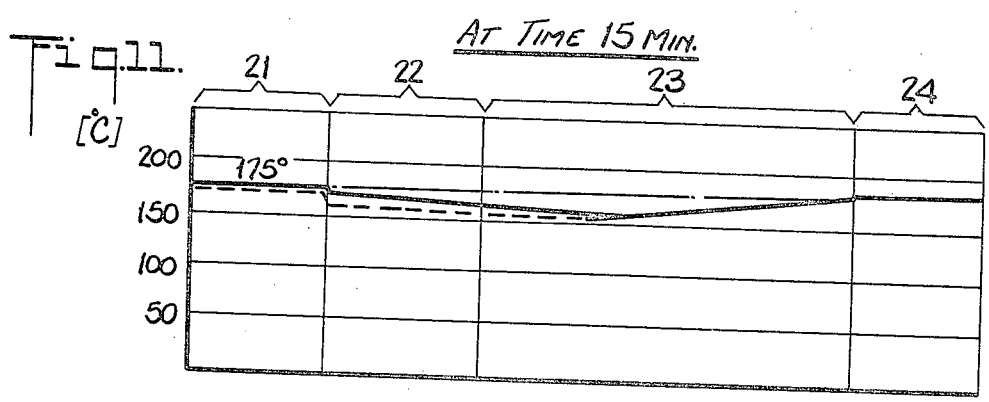

3,489,833
PROCESS OF VULCANIZING MOLDED ARTICLES
Josef P. Lehnen, Verlautenheide-Aachen, Germany, assignor to Englebert Aktiengesellschaft, Aachen, Germany, a corporation
Filed Jan. 28, 1966, Ser. No. 523,791
Claims priority, application Germany, Mar. 30, 1965,
E 28,997
Int. Cl. B29h 5/00
U.S. Cl. 264—315                      7 Claims

ABSTRACT OF THE DISCLOSURE

A process of vulcanizing molded articles, such as pneumatic tries, with a shortened mold cycle is disclosed. During the warming up period of the cycle, a heating medium at a high pressure and at a high temperature appreciably in excess of the maximum permissible vulcanizing temperature of the article is used, to shorten the warming up period. When a selected reference point of the article reaches a specified reference temperature which corresponds to the attainment of a temperature not in excess of the maximum permissible vulcanizing temperature at the hottest point of the article, the starting heating medium is replaced by a second heating medium at the same pressure but at a temperature which is not in excess of the maximum permissible vulcanizing temperature, the second medium providing a further source of heat to continue the vulcanization. The use of saturated steam and hot water as the two successive heating media is preferred.

---

This invention relates to a process of and apparatus for vulcanizing molded articles, especially pneumatic tires, by application of shaping pressure and heat, which heat is transmitted by means of a heating medium to the article to be vulcanized through interposed heat-conducting separating walls, while the heating medium temperature is changed during the vulcanizing operation.

The molded articles to be vulcanized consist in the first instance of natural or synthetic rubber mixtures. Known heating media are steam, hot water or the like. During the vulcanization of molded articles heat is not conducted thereto directly, but rather indirectly through the wall of the mold. The mold may be not only a receptacle for the molded article, but also a receptacle for the heating medium and for this purpose is provided with hollow spaces, ducts or the like. In such case, the mold is advantageously fixedly connected with the vulcanizing apparatus and the connections for the heating medium. In another known embodiment, the mold is a more or less massive body around which, for example in an autoclave, the heating medium flows. Alternatively the mold is located between heating platens traversed by the heating medium, for example in a platen press. In the two last-named cases the mold is generally taken out of the vulcanizing apparatus for purposes of unloading and loading, during which time the mold parts are more or less greatly cooled. This is the so-called intermittent operation. The described molds in general consist of metal. The shaping pressure in these molds is attained by pressing the mold parts together.

For the vulcanization of pneumatic tries for vehicles, aircraft and the like, the metallic mold embraces only the outer part of the molded article. Into the interior of the ballooned tire a so-called heating bladder or air bag of elastic material is introduced, through which a heat-emitting heating medium under pressure is conducted. In this manner the molded article is subjected to the aforesaid shaping pressures and is supplied with heat from within (internal heating). In addition the article is supplied with heat from without through the aforesaid metallic mold which embraces the molded article from the outside (external heating).

The previously mentioned separating walls are, in the described vulcanizing operations, constituted by the mold walls, the walls of the heating bladder on air bag, or the like.

For economic reasons, attempts are made to make the heating period for the vulcanization of the aforesaid molded articles of rubber mixtures as short as possible. This is especially important in the utilization of expensive vulcanizing apparatus such as tire curing presses, for example.

The vulcanization period of a rubber mixture is in known fashion determined by the make-up of the mixture and by the magnitude and variation, with respect to time, of the vulcanizing temperature. The acceleration of a mixture cannot be arbitrarily increased in view of the required workability of the mixture and the desired characteristics of the vulcanizate. Fundamentally there also exist limits to an increase of the vulcanizing temperature because of, among other reasons, the low heat transfer capacity of the material, especially in thickwalled articles such as tires. At too high temperatures the outer boundary regions of these articles would already be overheated when the inner region first attains the optimum heat or is even still underheated. For this reason a lower maximum permissible vulcanizing temperature is generally selected for thick-walled than for thin-walled molded articles.

Apart from the recipe of the mixture and the vulcanization temperature, the total heating period is also influenced by the so-called warming up period. This is the interval of time which is required in order to bring the respective objects to be heated to the desired temperature. First of all, the molded article itself, which upon being inserted into the mold generally is at only room temperature, must be warmed up. In the case of pneumatic tires, this article is the uncured tire band. Further the heat-transmitting separating walls, to the extent that they were cooled in the period between two successive heating cycles, must be heated to a high temperature at the beginning of the heating period. For molded articles of various types, the mold must also be heated to a high temperature. In the vulcanization of tires, the heating bladder or air bag must be heated to a high temperature. Due to the poor thermal conductivity of the material (e.g. rubber) of the heating bladder or air bag, it takes a certain period of time before the tire at its inner face engaging the heating bladder or air bag reaches the maximum permissible vulcanizing temperature.

There is known, indeed, the so-called free heating, In this process the heating medium acts without interposition of separating walls on the article to be vulcanized. It has also been attempted to apply this method to the internal heating in the vulcanization of tires. This process has, however, led to difficulties, especially with respect to a satisfactory seal at the beads. It has thus not become accepted in practice. The invention accordingly concerns itself only with vulcanizing processes making use of separating walls.

In considering the possibilities of shortening the heating period the following must be noted. On the one hand, saturated steam is especially well suited to transmit heat to a solid body. On the other hand, the shaping of the molded article requires in general a pressure of about 20 to 30 atmospheres. This internal pressure cannot be substantially lower, since otherwise defects such as blisters, sseparations, smudged moldings and the like occur. The saturated steam temperatures corresponding to the said pressures, however, lie appreciably above the usual maximum permissible vulcanizing temperature of approximately 160° to 180° C. With hot water the stated pressures as well as the stated temperatures can be attained. The use of hot water entails the disadvantage, however, that the transfer of heat to the solid body is poorer than with saturated steam.

On the basis of the foregoing considerations, the following processes have become known.

It has been attempted to shorten the warming up period by making the temperature of the heating medium for the internal heating higher than the maximum permissible vulcanizing temperature. As a consequence thereof, however, the temperature of the tire continues to rise after the end of the warming up operation and during the main heating period to above the maximum permissible vulcanizing temperature, substantially up to the temperature of the heating medium. By virtue of this exceeding of the temperature there results a non-uniform curing, for which reason this process is unusable.

Attempts have further been made to shorten the warming up period by employing a heating medium with a higher heat transfer coefficient, e.g. flowing saturated steam. In accordance with the explanations hereinabove set forth, by virtue of the interrelation of pressure and temperature, there corresponds to a saturated steam temperature which is not higher than the maximum permissible vulcanizing temperature (e.g. 175° C.) a steam pressure of only about 9.5 atmospheres. This pressure is, as already stated, too low for achieving an acceptable shaping and a fault-free vulcanizate. Were a sufficiently higher pressure of approximately 20 atmospheres to be chosen, then the steam temperature would be about 210° C. This temperature lies far above the maximum permissible vulcanizing temperature which experience has shown to be usable and, if the steam is maintained unchanged during the main heating period as well, leads perforce to a non-uniform through heating of the article and thereby to defective products. The use of saturated steam as a heating medium in the just described known manner is thus also impractical.

Accordingly, attempts have become known to use the previously mentioned low steam pressure of approximately only 9.5 atmospheres only for a specified period of time at the beginning of the heating period and subsequently to continue the heating with the usual hot water under high pressure. However, the shaping of the article is effected mainly at the start of the heating, i.e. as long as the material is still plastic and flows well. Due to the low pressure, however, this occurs only to an insufficient degree. On the other hand, during this period an initial vulcanization of the material takes place. As a result, even the subsequent increase of the pressure does not provide a satisfactory shaping of the article. For this reason this process has also not proved useful.

Further, attempts to work with steam of varying high temperatures and correspondingly varying high pressures have become known. By way of example, during the first part of the heating period a high pressure and high temperature, e.g. 14 atmospheres at 197° C., are chosen, and during the remaining part of the heating period a lower pressure and lower temperature, e.g. 7 atmospheres at about 170° C. Due to the lower pressure, however, blisters and the like cannot be avoided with assurance in this process. This process also thus has not come into practice.

The invention is based on the problem of conducting the heretofore described process of vulcanizing molded articles in such a manner that during the vulcanization the total heating period, which consists of the warming up period and the main heating period, is as short as possible and that thereby the described disadvantages can be avoided.

For the solution of this problem, the process according to the present invention is characterized by the fact that for the rapid warming up of both the separating wall parts which are cooled at the beginning of each vulcanizing operation and the molded article, the heating medium temperature for these separating wall parts is set, within the warming up period of the molded article and approximately until its maximum permissible vulcanizing temperature is reached, higher than this temperature, that the temperature is thereafter lowered, and that the working duration of the various heating medium temperatures is adjusted in dependence on the temperature (reference temperature) of a predetermined point (reference point) of the molded article to be vulcanized.

A more precise analysis of the warming up period can be derived from the following. The warming up period starts in general when the mold has been completely closed and ends approximately when the attainment of the maximum permissible vulcanizing temperature. That is the temperature which must not be exceeded at any point in the article and at any time, if an acceptable vulcanizate is to be obtained.

By the implementation of the aforesaid process the main heating period is by and large not altered. Under the term "main heating period" is understood the period from the time the maximum permissible vulcanizing temperature is reached until the heating medium is shut off. After the heating medium has been shut off and also after the molded article has been taken out of the mold, the vulcanizing process continues for a little while longer, since the temperature of the article in general does not immediately drop below the point at which no further vulcanization can take place. This interval of time is designated the post heating period. It is also not affected by the process according to the invention. On the other hand, the process according to the invention in the first instance serves to shorten the previously described warming up period.

In particular, the process according to the invention can further be characterized as follows. For the purpose of rapid warming up of all parts to be heated, i.e. for accelerating the warming up operation, the heating medium should have a temperature which is higher than the maximum permissible vulcanizing temperature. In order to ensure that nevertheless the maximum permissible vulcanizing temperature is not exceeded in the molded article itself, the heating medium temperature in accordance with a further aspect of the invention should be lowered after a predetermined working time interval. A further characteristic of the invention then is that the working period is determined in dependence on the reference temperature of a predetermined reference point of the article to be vulcanized.

The reference point at which the reference temperature is to be measured can basically be located at any desired point in the article to be vulcanized, and in particular in the interior thereof as well as on its outer surface. In a given molded article and with a given time variation of the rise in temperature, a fixed relation exists between the rate of change of temperature at any specified point and the rate of change of temperature at any other point. This relation must, of course, be determined by experiments and/or calculations. Once this has been done, however, basically any suitable point can serve as the reference point, and naturally any reference point in the interior of the molded article will be denoted by a lower reference temperature than a reference point on that outer surface of the molded article which engages the corresponding separating wall parts to be rapidly heated up. At a reference point of the last-named type, the reference temperature involved should be of the order of magnitude of the maximum permissible vulcanizing temperature. At a reference point of the first-named type in the interior of the molded article, a correspondingly lower reference temperature is involved.

Advantageously, the aforesaid relation is determined from the temperature variation at the reference point and at a point in the critical zone of the molded article. This is the zone which follows the temperature increase most rapidly, in which thus in comparison to other zones or points specified temperature values are reached first. In this manner, that value of the reference temperature is determined which exists when the critical point is at the maximum permissible vulcanizing temperature. Once this value has been determined for the various types of molded articles, the so-determined reference temperature can be finally specified for heating of like articles. A reference point located on the outer surface of the molded article which is in engagement with the heating bladder or air bag has the advantage that it is readily accessible for measurements and lies in the critical zone of the molded article. The reference temperature in this case is, therefore, equal to the temperature of the critical zone. A measurement at a reference point so located thus provides special assurance against overheating.

A special version of the process according to the invention is characterized by the fact that the heating medium temperature is lowered (changed over) when the reference temperature has reached a predetermined value (change-over temperature). In this manner, the working period of the higher temperature of the heating medium is determined in dependence on the reference temperature.

The process according to the invention makes it possible that the parts of the outer surface of the molded article engaging the parts of the separating walls to be rapidly heated, are heated as rapidly as possible to the maximum permissible vulcanizing temperature without the occurrence of any overheating. A substantial shortening of the warming up period is thereby achieved, which leads to a shortening of the total heating period. This leads to a more economical utilization of the expensive vulcanizing apparatus, and it is nevertheless reliably assured that the maximum permissible vulcanizing temperature will not be exceeded.

In accordance with the explanations hereinbefore set forth, the magnitude of the change-over temperature is also dependent on the choice of the respective reference point. The change-over of the heating medium temperature can, moreover, take place according to the present invention in a plurality of stages rather than in a single stage, which stages in certain circumstances are dependent on corresponding previously selected change-over temperatures, if desired also at various reference points.

Advantageously, the process according to the invention is characterized by the fact that the change-over temperature and the degree of lowering of the heating medium temperature are so chosen that neither during the warming up period, up to the instant of the change-over, nor during the subsequent main heating period will the maximum permissible vulcanizing temperature be exceeded at any point in the molded article.

Because of possible further temperature run-up at the time, it is advantageous under certain circumstances to select the change-over temperature correspondingly somewhat lower so that, taking into account the after change-over temperature run-up, at no time is the vulcanizing temperature exceeded at any point in the molded article. A possible temperature run-up results from the following interrelations. By virtue of the low heat transfer capacity of the walls of the heating bladder or air bag, the temperature at the side of the bladder or air bag facing the tire does not immediately follow the temperature decrease in the heating medium. Under certain conditions the temperature can rise still further, and in this way the temperature of the outer surface of the tire engaging the bladder or bag would also rise.

In particular the process according to the invention can then be characterized by the fact that the heating medium temperature prior to the change-over is appreciably above the maximum permissible vulcanizing temperature of the molded article, and by the fact that thereafter it is approximately as high as this temperature or, if desired, also lower.

When the heating medium temperature prior to the change-over is appreciably above the maximum permissible vulcanizing temperature of the molded article, there results the greatest possible shortening of the warming up period. If a heating medium with a continuously variable temperature is available, then the change-over can also be achieved in such a manner that, in accordance with the explanations previously set forth herein, it is effected either in stages or continuously in such a manner that at no time and at no point in the article is the maximum permissible vulcanizing temperature exceeded.

An advantageous embodiment of the process according to the invention is characterized by the fact that until the change-over a heating medium of high heat transfer coefficient is employed.

This process is then further characterized by the fact that the heating medium employed up to the change-over is a vapor, preferably steam.

A particularly advantageous embodiment of the process according to the invention is then characterized by the fact that until the change-over, saturated steam is employed under high pressure (e.g. approximately 20 to 30 atmospheres), as it is required for the shaping of the molded article, at which time the saturated steam temperature is at the high value (e.g. approximately 210° to 230° C.) prescribed by the laws of physics and exceeds the maximum permissible vulcanizing temperature (e.g. approximately 175° C.).

In this connection it should be noted that for the purposes of achieving an acceptable shaping and of avoiding vulcanizing defects, the pressure of the heating medium should be at least 18 atmospheres, as is the practice. The upper limit is defined by the available load limit of the press construction. In the process according to the invention, during the warming up period the use of saturated steam results in an exceptional accord between the desired high temperature during warming up and the desired high pressure.

A further modification of the process according to the invention is characterized by the fact that at the change-over, for the purpose of lowering the heating medium temperature, an exchange of the heating medium is undertaken.

The process according to the invention can then be characterized by the fact that the heating medium after the change-over is a liquid, preferably hot water at a pressure of about 20 to 30 atmospheres, as it is required for the shaping of the molded article, and at a temperature which is approximately as high as the maximum permissible vulcanizing temperature (e.g. approximately 175° C.) for the molded article or, if desired, also lower than this temperature.

This aspect of the process stems from the realization that for the chemical reaction of the vulcanization relatively little heat is required, and in particular mainly only to compensate for heat losses. This low heat requirement during the main heating period can easily be compensated for by means of a liquid heating medium with relatively low heat transfer capacity, such as is possessed by hot water, without engendering thereby any lengthening of the main heating period. A considerably greater quantity of heat, on the other hand, is required for warming up the molded article, the mold and the heating bladder or air bag. In order to transfer this large quantity of heat in as short a time as possible, according to the invention the stated heating medium with high heat transfer coefficient, preferably saturated steam, is employed during the warming up period. The described exchange of heating medium thus has the advantage that until the change-over a warming up under high pressure takes place as rapidly as possible, so that on the one hand the warming up period is shortened as much as possible, and that on the other hand under the high pressure of good shaping is effected; and that after the change-over a continued heating at the maximum permissible vulcanizing temperature under equally high pressure takes place, so that on the one hand at no point in the molded article is the maximum permissible vulcanizing temperature exceeded, and that on the other hand the shaping of the molded article is effected in a satisfactory manner until the end of the vulcanizing operation. The utilization of a vaporous heating medium and thereafter of a liquid heating medium has the further advantage that the change-over from the first medium to the second medium can be effected especially rapidly, inasmuch as upon the introduction of the liquid medium the vaporous medium immediately condenses and thereafter is inactive as such. The resulting heat of condensation can also be taken into account in that the temperature of the liquid heating medium at the first instant is selected somewhat lower than is required for further heating. The rapid changeover from the one medium to the other, i.e. the rapid temperature decrease, has the following advantage. As soon as the maximum permissible vulcanizing temperature is reached, there is to be no further rise of the temperature of the article at any point thereof. This could, however, occur to a certain degree by virtue of the heat still present in the heating bladder material (temperature run-up). Through the change from a vaporous to a liquid heating medium at a lower temperature this temperature run-up is minimized.

The apparatus for carrying out the described process can be characterized by a temperature sensing element located at the reference point for the automatic control of instrumentalities for influencing the heating medium upon attainment of the change-over temperature.

A somewhat differently constructed apparatus can be characterized by a time switch device (timer) serving for the control of instrumentalities for influencing the heating medium upon attainment of the change-over temperature, which timer can be adjusted to values of the working period of the heating medium up to the change-over as determined by preliminary tests.

The apparatus can further be characterized by a construction of the separating wall parts, which are to be rapidly heated at the start of each vulcanizing operation, in the form of a heating bladder, air bag or the like made of rubber, synthetic plastics, textile material or the like.

Especially with these materials, which have a poor heat transfer capacity, is the process according to the invention of particular importance, inasmuch as, in the known processes, by virtue of the poor heat transfer capacity the warming up of these parts, and of the outer surface parts of the molded article bounding against these parts, requires a considerable amount of time, so that through the process according to the invention and through the shortening of the warming up period achieved thereby an appreciable advantage is obtained.

The apparatus can further be characterized by additional separating wall parts which are adjuncts of the metallic mold employed and which during the entire vulcanizing operation are maintained approximately at the maximum permissible vulcanizing temperature of the molded article.

Hereinafter the process according to the invention is further illustrated in an example of the heating of a PKW tire in a so-called bladder press, using saturated steam as the warming up heating medium and hot water during the main heating period. The process is not limited to the details set forth in this example, but applies in an analogous manner to all types of tires, to all other types of presses or vulcanizing apparatus, to heating bladders or air bags, and to all types of vulcanizing molds. The description is set forth in connection with the idealized representation on the appended graph drawings. The solid lines in the same correspond to the process according to the invention, while the broken lines represent the temperature course in the known pure hot water heating operation.

FIGS. 1 to 4 show the temperature variation with time at different places in the heat system. The ordinates show temperature in degrees Centigrade, and the abscissas the time in minutes. With reference to the designations in FIG. 5, FIGS. 1 to 4 represent the temperature variation in the following places: FIG. 1 in the cavity 21 of the heating bladder 22; FIG. 2 at the inner surface 25 of the bladder wall 22; FIG. 3 at the outer surface 26 of the bladder wall 22; and FIG. 4 at the inside of the tire wall 23.

In FIG. 4, further, 12 designates the maximum warming up period, 13 the main heating period and 14 the total heating period, equal to warming up period plus main heating period in the process according to the invention. 16 is the excess time requirement of the conventional pure hot water heating. The abscissa portion 17 corresponds to the pre-molding interval.

In FIGS. 6 to 11 are illustrated the local temperature variations at different points in time.

The time course of the process according to the invention is as follows: The heating period starts with the introduction of the warming up medium at the time point 0 minutes. In the illustrated example, the pressure of the heating medium is assumed to be 21 atmospheres; where saturated steam is used, this corresponds to a saturated steam temperature of 214° C. In the bladder cavity 21, FIG. 1, the temperature shortly after the introduction of the heating medium is 214° C. as designated by line segment 1. Due to the good heat transfer when saturated steam is used, the bladder inner surface 25 reaches the temperature of the heating medium (214° C.) relatively rapidly, as designated by line segment 2 in FIG. 2. At the outer surface 26 of the bladder, the temperature rises appreciably slower due to the poor heat transfer capacity of the bladder material, as designated by line segment 3 in FIG. 3. At the inner surface 27 of the tire, the temperature rise is still lower due to the somewhat poorer heat transfer in the zone of contact between the bladder and the tire, as designated by line segment 4 in FIG. 4.

The maximum permissible vulcanizing temperature is in this example fixed at 175° C. The reference point selected is a point at the inside of the tire. The reference temperature in this case is, therefore, equal to the outer surface temperature of the inside of the tire. To the extent that heat is conducted to the molded article from the outside, its outer surface has the highest temperature, which in the case of internal heating of the tire means the inside of the tire. The inside of the tire thus is the basic factor with respect to attainment of the maximum permissible vulcanizing temperature. Since in the example given the reference temperature is equal to the temperature of the inside of the tire, the maximum permissible vulcanizing temperature is reached when the reference temperature is 175° C. As can be seen from FIG. 4, the reference temperature reaches this value at point IV.

Were the high temperature of the heating medium to be continuously maintained without any time limit, the temperatures at the different parts of the heat system, i.e. also at the inside of the tire, would rise almost or completely up to the level of the temperature of the heating medium, see FIG. 3, line segment 8 and 5, and FIG. 4, line segment 10 and 6, i.e. the maximum permissible vulcanizing temperature would be exceeded, which would lead to defective vulcanizates.

In order to avoid this, the working period of the high heating medium temperature is limited. It continues at most until the reference temperature reaches its predetermined value, in the example 175° C. In FIG. 4 this corresponds to the point IV at the time point 5¼ minutes. At this time at the latest, the change-over from saturated steam to hot water takes place, i.e. the reduction of the heating medium temperature from 214° C. to 175° C. The temperature curve 4 of the reference point thus has a break at the point IV and its course is between the points I–IV–VII, ending in line segment 7.

If the heat system has a given temperature run-up, i.e. if the temperature of the outer surface of the heating bladder still rises somewhat, after the change-over, FIG. 3, from point IV to point V, line segment 8, then the temperature curve at the inside of the tire, FIG. 4, would follow the points I–IV–V–VII; i.e. the maximum permissible vulcanizing temperature would be exceeded for a short time at the point V. If this brief exceeding of the temperature is also to be avoided, this can be achieved by effecting the change-over somewhat earlier, i.e. at a somewhat lower reference temperature, e.g. at the point III, FIG. 4, corresponding to the time point 5 minutes and a temperature of 165° C. This results in a temperature curve at the inside of the tire between the points I–III–IV–VIII, line segments 4 and 9.

The change-over can also be effected even earlier, for example in the given example at point II. The temperature curve then corresponds to the line segments 4 and 11. The earlier the change-over takes place, the more the temperature curve of the process according to the invention approaches the curve of the pure hot water heating. The process thus can be widely varied.

As can be seen from FIGS. 2 to 4, the temperature rise when steam is used as the warming up medium (solid lines) takes place considerably faster than in the conventional use of hot water at 175° C. (broken lines). In this way a considerable shortening of the warming up period is achieved, while nevertheless through the process according to the invention an exceeding of the maximum permissible vulcanizing temperature is inhibited.

In FIGS. 5 to 11 the local temperature course at different times is illustrated. FIG. 5 is a section through the heat system. In the same, 21 designates the cavity of the heating bladder, 22 the wall of the bladder, 23 the wall of the tire and 24 the outer metallic mold. The bladder cavity 21 is filled with the heating medium 30 which transfers its heat directly to the bladder inner surface 25. The heat travels by conduction through the bladder wall 22 (separating wall) to the bladder outer surface 26. From there it goes over to the outer surface of the inside of the tire 27. Numeral 28 designates the outer surface of the outside of the tire which engages the inner surface 29 of the metallic mold 24. FIG. 6 shows the local temperature occurs at the time point 0 minutes, i.e. at the introduction of the warming up heating medium. In the bladder cavity 21 shortly thereafter the temperature is 214° C. The inner surface 25 of the bladder at this point of time is still at the pre-molding steam temperature of 116° C., and the outer bladder surface 26 is at the cooling interval temperature of approximately 90° C. The outer surface 27 of the inside of the tire is at approximately room temperature. During the working period of the heating medium, the temperatures at all points rise. The temperature variations in connection with change-over of the heating medium are illustrated in FIGS. 8 and 9. For further illustration it is assumed that the change-over takes place at time point 5 minutes, i.e. at point III in FIG. 4. In FIG. 7 is indicated the temperature status of the different locations shortly prior to this time point, i.e. at the moment at which the reference temperature is still somewhat below the maximum permissible vulcanizing temperature. The temperature of the outside of the bladder is approximately 190° C. (point XII in FIG. 8), and the temperature of the inside of the tire (point XIII in FIG. 8 or point III in FIG. 4) is approximately 170° C. Immediately thereafter the change-over the heating medium takes place. The temperature relationships at the time point 6 minutes are shown in FIG. 9. The bladder cavity 21 is now filled with hot water at 175° C. The temperature of the inner surface 25 of the bladder has dropped to 175° C. At the outer surface 26 of the bladder the temperature has still risen somewhat up to the point IV in FIG. 3, due to the temperature run-up, but then it falls so that at the time point 6 minutes (point XIV in FIG. 9) it is also 175° C. The temperature of the inside 27 of the tire, which at the change-over time point III was approximately 165° C., has risen somewhat to 175° C. by virtue of the temperature run-up (point IV in FIG. 4) until the time point 6 minutes, but falls to a value of 165° C. (point XV in FIG. 9 and line segment 9 in FIG. 4).

For purposes of completeness, the shaping or ballooning interval has also been entered in FIGS. 1 to 4, i.e. the time interval 17. The shaping can be effected by means of saturated steam at approximately 1.8 atmospheres and at a temperature of about 116° C. The working period is relatively short, approximately 20 to 40 seconds, while simultaneously the closing of the press takes place. The heating bladder, which after the termination of the heating period of the preceding heating cycle was cooled to about 90° C., is during this operation warmed up to a temperature of about 115° C. by the shaping steam.

The percentage reduction of total heating period if air bags are used is of especially great significance. As is well known, this includes the ballooning of the tire and the insertion of the air bag outside of the press. The air bag thus is at a temperature of at most about 25 to 30° C. (room temperature). Since with the use of an air bag the shaping and thus a heating by means of saturated steam is dispensed with, its outer surface, at the start of the heating period, i.e. at the time point 0 minutes, is at a temperature of only about 25 to 30° C. as distinguished from the 115° C. temperature existing when a heating bladder is used for shaping. There is thus required an additional warming up period in order to heat the air bag from 25° C. to 115° C.

This additional warming up period is of different duration depending on whether hot water or saturated steam is employed as the heating medium. For the illustrated example the following relationships are illustrated in FIG. 3: The line segment 18 corresponds to the use of hot water as the warming up heating medium. The time for this is, corresponding to the abscissa section between the points X and I, 4 minutes. With use of saturated steam the line segment 19 corresponds to the temperature curve and the warming up period is only 2 minutes, corresponding to the abscissa section between the points XI and I. The percentage reduction of total heating period attainable through use of a vaporous warming up heating medium is still greater when an air bag is used. In the example the total heating period with pure hot water operation would be 19 minutes (15 minutes between points I and IX plus 4 minutes between points X and I), whereas by implementation of the process according to the invention it would be only 13 minutes (11 minutes between points I and VII plus 2 minutes between points XI and I), so that the percentage reduction is 6/19, i.e. (19−13)/19, or approximately 30%.

The process is not limited to saturated steam as the heating medium. Other vaporous and gaseous or liquid media of suitable physical and chemical properties can be employed for the process. The same medium can also be employed for both the warming up and the main heating interval, for example hot water of differently high temperatures. Critical for the process is that the heating medium be at a temperature higher than the maximum permissible vulcanizing temperature only during the warming up interval and that its temperature be lowered as soon as the reference temperature has attained a specified value. The process is further not limited to pneumatic tires, but can be used to advantage in any application where the warming up period constitutes an appreciable part of the total heating period. This is mostly the case with intermittent operation, especially if the vulcanization mold is taken out of the vulcanizing apparatus and thus becomes cooled. It is especially advantageous when the vulcanizing apparatus also cools at the same time, as for example in the case of autoclaves while molds are being exchanged.

Having thus described my invention, what I claim and desire to protect by Letters Patent is:

1. In the process of vulcanizing molded articles, especially pneumatic tires, wherein shaping pressure and heat are used and, over a total heating period consisting of a warming up period followed by a main heating period, the heat is transmitted to the molded article to be vulcanized by means of a heating medium through an interposed flexible heat conducting separating wall which is normally in a cooled down state at the start of each individual vulcanization operation, and wherein the heating medium temperature is changed during the vulcanization operation; the improvement comprising the steps of contacting said separating wall at the start of each vulcanization operation with a first heating medium at a high pressure and at a temperature which appreciably exceeds the maximum permissible vulcanizing temperature to be attained in said article, maintaining said first heating medium at the starting temperature and pressure for the duration of said warming up period, terminating said warming up period after a time interval sufficient to permit attainment, at a selected reference point of said article, of a specified reference temperature corresponding to the attainment of a temperature not in excess of said maximum permissible vulcanizing temperature at the hottest point of said article, and thereupon, without any substantial reduction of said high pressure, replacing said first heating medium by a second heating medium at a lower temperature not in excess of said maximum permissible vulcanizing temperature but nevertheless sufficiently high to enable said second heating medium to supply additional heat to said article for continued vulcanization thereof for the duration of the main heating period, the lower heating medium temperature being selected to ensure that the maximum permissible vulcanizing temperature is also not exceeded at any point in said article during said main heating period.

2. The process of claim 1, wherein the heating medium employed up to the changeover is saturated steam, and wherein the heating medium employed after the change-over is water.

3. The process of claim 2, wherein at the change-over said water is admitted into the space containing said saturated steam while the latter is still active, whereby the resultant condensation of the steam effects a sudden temperature drop.

4. The process of claim 1, wherein the heating medium employed up to the change-over is one having a high heat transfer coefficient.

5. The process of claim 1, wherein the nature of the two heating media is the same except for the lowering of the heating medium temperature at the change-over point.

6. The process of claim 1, wherein a temperature-sensing element located at the reference point is employed for automatically controlling the heating medium change-over.

7. The process of claim 1, wherein a timer preadjusted to the desired duration of the warming up period is employed for automatically controlling the heating medium change-over.

References Cited

UNITED STATES PATENTS

| | | | |
|---|---|---|---|
| 1,500,700 | 7/1924 | Blaker | 264—315 |
| 1,839,877 | 1/1932 | Heintz | 264—327 X |
| 2,066,265 | 12/1936 | Freeman | 264—327 X |
| 3,002,228 | 10/1961 | Salem et al. | 264—315 |
| 3,127,460 | 3/1964 | Freeman | 264—315 |
| 1,516,629 | 11/1924 | Blaker | 264—326 |
| 1,631,943 | 6/1927 | Urquhart | 264—326 |
| 1,798,210 | 3/1931 | Laursen | 264—326 |
| 3,329,748 | 7/1967 | Hugger | 264—326 |

ROBERT F. WHITE, Primary Examiner

N. RUSHEFSKY, Assistant Examiner

U.S. Cl. X.R.

264—327

PO-1050
(5/69)

UNITED STATES PATENT OFFICE
CERTIFICATE OF CORRECTION

Patent No. 3,489,833      Dated January 13, 1970

Inventor(s) JOSEF P. LEHNEN

It is certified that error appears in the above-identified patent and that said Letters Patent are hereby corrected as shown below:

Column 1, line 15, "tries" should read --tires--; line 62, "tries" should read --tires--. Column 2, line 5, "on" should read --or--; line 69, "sseparations" should read --separations--. Column 4, line 13, "when" should read --with--. Column 9, line 42, "occurs" should read --course--.

Signed and sealed this 3rd day of November 1970.

(SEAL)
Attest:

EDWARD M. FLETCHER, JR.
Attesting Officer

WILLIAM E. SCHUYLER, JR.
Commissioner of Patents